(12) United States Patent
Lu et al.

(10) Patent No.: US 10,173,928 B2
(45) Date of Patent: Jan. 8, 2019

(54) DIELECTRIC CERAMIC COMPOSITION

(71) Applicant: Industrial Technology Research Institute, Hsinchu (TW)

(72) Inventors: Chun-An Lu, New Taipei (TW); Hong-Ching Lin, Kaohsiung (TW); Chiung-Hsiung Chen, Hsinchu County (TW); Yuan-Ling Tsai, Changhua County (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 15/846,227

(22) Filed: Dec. 19, 2017

(65) Prior Publication Data

US 2018/0251405 A1    Sep. 6, 2018

Related U.S. Application Data

(60) Provisional application No. 62/466,330, filed on Mar. 2, 2017.

(51) Int. Cl.
 C04B 35/495    (2006.01)
 C04B 35/443    (2006.01)
 C04B 35/626    (2006.01)
 C04B 35/64     (2006.01)

(52) U.S. Cl.
 CPC .......... *C04B 35/495* (2013.01); *C04B 35/443* (2013.01); *C04B 35/6261* (2013.01); *C04B 35/6264* (2013.01); *C04B 35/64* (2013.01); *C04B 2235/3206* (2013.01); *C04B 2235/3222* (2013.01); *C04B 2235/3255* (2013.01); *C04B 2235/36* (2013.01); *C04B 2235/6567* (2013.01);
(Continued)

(58) Field of Classification Search
 CPC .................................................... C04B 35/495
 See application file for complete search history.

(56) References Cited

U.S. PATENT DOCUMENTS

| 8,043,721 B2 | 10/2011 | Khadilkar et al. |
| 8,507,393 B2 | 8/2013 | Park et al. |
| 9,153,863 B2 | 10/2015 | Nair et al. |

(Continued)

FOREIGN PATENT DOCUMENTS

| CN | 1724464 | 1/2006 |
| CN | 103803956 | 5/2014 |

(Continued)

OTHER PUBLICATIONS

Hirotaka Ogawa et al.,"Crystal Structure of Corundum Type Mg4(Nb2-xTax)O9 Microwave Dielectric Ceramics With Low Dielectric Loss",Journal of the European Ceramic Society,vol. 23, Issue 14,Dec. 2003,pp. 2485-2488.

(Continued)

*Primary Examiner* — Karl E Group
(74) *Attorney, Agent, or Firm* — JCIPRNET (57) ABSTRACT

A dielectric ceramic composition includes a first inorganic component having a trigonal ditrigonal pyramidal crystal structure, a second inorganic component having a hexoctahedral crystal structure, and a solid solution portion of the trigonal ditrigonal pyramidal crystal structure and the hexoctahedral crystal structure is formed between the first inorganic component and the second inorganic component.

12 Claims, 5 Drawing Sheets

(52) U.S. Cl.
CPC ...... *C04B 2235/76* (2013.01); *C04B 2235/80* (2013.01)

(56) References Cited

U.S. PATENT DOCUMENTS

2013/0190163 A1  7/2013  Sakurai et al.
2017/0283327 A1* 10/2017  Hill ...................... C04B 35/117

FOREIGN PATENT DOCUMENTS

| JP | 2000327412 | 11/2000 |
| JP | 2003165772 | 6/2003 |
| TW | 200908439 | 2/2009 |
| TW | I461385 | 11/2014 |

OTHER PUBLICATIONS

Atsushi Yoshida et al.,"Influence of Zn and Ni substitutions for Mg on dielectric properties of (Mg4-xMx)(Nb2-ySby)O9 M=Zn and Ni) solid solutions",Journal of the European Ceramic Society,vol. 24, Issue 6, Jun. 2004,pp. 1765-1768.

* cited by examiner

DIELECTRIC CERAMIC COMPOSITION

CROSS-REFERENCE TO RELATED APPLICATION

This application claims the priority benefit of U.S. provisional application Ser. No. 62/466,330, filed on Mar. 2, 2017. The entirety of the above-mentioned patent application is hereby incorporated by reference herein and made a part of this specification.

TECHNICAL FIELD

The disclosure relates to a dielectric ceramic composition for low dielectric constant (Dk) and low dielectric loss at microwave frequency.

BACKGROUND

Millimeter-wave (MMW) frequencies in Fifth Generation (5G) wireless communications networks have been developed, in support of moving massive amounts of data quickly.

As signal frequencies move into the millimeter-wave range, the radiation loss of millimeter wave is very high to limit coverage of 5G application. One solution is to reduce the dielectric constant and the dielectric loss of the package substrate in RF module. In case of MMW communications, the dielectric constant of the package substrate is preferably less than 4 @10 GHz.

Recently, a method for reducing the dielectric constant is to add glass into the ceramic material in order to manufacture a glass ceramic material for the package substrate. However, the nucleating agent used in the glass ceramic material may hinder the reduction of dielectric loss. Moreover, due to the glass component in the glass ceramic material, the heat transfer efficiency cannot be improved. Therefore, it is necessary to develop a dielectric ceramic composition with low dielectric constant and low dielectric loss.

SUMMARY

One of the present embodiments comprises a dielectric ceramic composition includes a first inorganic component having a trigonal ditrigonal pyramidal crystal structure, a second inorganic component having a hexoctahedral crystal structure, and a solid solution portion of the trigonal ditrigonal pyramidal crystal structure and the hexoctahedral crystal structure is formed between the first inorganic component and the second inorganic component.

Another of the present embodiments comprises a dielectric ceramic composition includes a first inorganic component, a second inorganic component, and a solid solution portion is formed between the first inorganic component and the second inorganic component. The first inorganic component includes $Mg_4Nb_2O_9$, and the second inorganic component includes $MgAl_2O_4$, $Mg_2SiO_4$, $Mg_2TiO_4$, $Zn_2TiO_4$, $\beta$-$SiO_2$, or $Zn_2VO_4$.

Several exemplary embodiments accompanied with figures are described in detail below to further describe the disclosure in details.

DESCRIPTION OF THE EMBODIMENTS

Reference will now be made in detail to the present preferred embodiments of the disclosure, examples of which are illustrated in the accompanying drawings. Nevertheless, the disclosure may be embodied in many different forms and should not be construed as limited to the embodiments set forth herein.

The dielectric ceramic composition according to a first embodiment of the disclosure includes a first inorganic component having a trigonal ditrigonal pyramidal crystal structure, a second inorganic component having a hexoctahedral crystal structure, and a solid solution portion of the trigonal ditrigonal pyramidal crystal structure and the hexoctahedral crystal structure is formed between the first inorganic component and the second inorganic component.

The term "trigonal ditrigonal pyramidal crystal structure" used herein refers to the structure of ditrigonal pyramidal class in trigonal system, i.e., to a trigonal system having three axes, all in one plane, termed a, b, c and a=b≠c, i.e. the three axes are either shorter or longer than the c-axis.

The term "hexoctahedral crystal structure" used herein refers to the structure of hexoctahedral class in cubic system. In crystallography, the hexagonal crystal family is one of the 6 crystal families.

The term "solid solution" used herein refers to a solid-state solution of two components, and one of the components is similar to a solute, and the other is similar to a solvent. Therefore, the solid solution portion herein refers to a portion formed between the two components in which the crystal structure of one component remains unchanged by addition of another component.

In one embodiment, the first inorganic component, for instance, includes $Mg_4Nb_2O_9$.

In one embodiment, the second inorganic component, for instance, includes $MgAl_2O_4$, $Mg_2SiO_4$, $Mg_2TiO_4$, $Zn_2TiO_4$, $\beta$-$SiO_2$, or $Zn_2VO_4$.

In one embodiment, the content of the first inorganic component in the dielectric ceramic composition is, for instance, 25 to 50 atomic percent, and the content of the second inorganic component in the dielectric ceramic composition is, for instance, 25 to 50 atomic percent.

In another embodiment, the dielectric ceramic composition may optionally include a glass component. For example, the content of the glass component in the dielectric ceramic composition is, for instance, 30 weight percent or less. If the content of the glass component is 30 weight percent or less, the dielectric constant of the dielectric ceramic composition may be further reduced, while the thermal conductivity thereof may keep in good level.

The dielectric ceramic composition according to a second embodiment of the disclosure includes a first inorganic component, a second inorganic component, and a solid solution portion is formed between the first inorganic component and the second inorganic component. The first inorganic component includes $Mg_4Nb_2O_9$, and the second inorganic component includes $MgAl_2O_4$, $Mg_2SiO_4$, $Mg_2TiO_4$, $Zn_2TiO_4$, $\beta$-$SiO_2$, or $Zn_2VO_4$. The content of the first inorganic component in the dielectric ceramic composition is 25 to 50 atomic percent, for example. The content of the second inorganic component in the dielectric ceramic composition is 25 to 50 atomic percent, for example. Moreover, the dielectric ceramic composition of the second embodiment further includes a glass component.

The preparation of the dielectric ceramic composition according to the disclosure is as follows. However, the disclosure is not limited thereto.

First, two raw materials are provided, and the two raw materials have to meet the requirements of high symmetry crystalline phases. For example, the structure of ditrigonal pyramidal class (Hermann-Maugin symbol: 3m) and the structure of ditrigonal scalahedral class (Hermann-Maugin symbol: $\overline{3}$m) in trigonal system have high symmetry. Therefore, the material having trigonal ditrigonal pyramidal crystal structure such as $Mg_4Nb_2O_9$ may be used as raw material, and another raw material is the material having trigonal ditrigonal scalahedral crystal structure such as $(Sr_{1-2x}Na_x La_x)TiO_3$ (x<0.5), $AlBO_3$, $Al_2O_3$, or $Ta_2O_3$.

A co-firing is performed on the two raw materials at a predetermined temperature such as 1300° C. or above. Since the crystalline phases of the two raw materials have high symmetry, the co-fired product has low dielectric constant due to the offset of polarity, while having low dielectric loss due to high crystallinity. Before the co-firing, a calcination is optionally performed at a predetermined temperature such as 1250° C. or below. In case of adding a glass component, the glass component should be added to the co-fired product, and then a low temperature thermal treatment is performed at a temperature less than 1000° C.

In the following, the disclosure will be described more specifically by way of Examples, however, it is to be understood that the disclosure is not limited to the following Examples but can be practiced with appropriate changes.

EXAMPLE A-1

1. Preparation of $Mg_4Nb_2O_9$

There are two schemes for preparation $Mg_4Nb_2O_9$ as follows.

Scheme I. Excessive MgO was used to stabilize the phase of $Mg_4Nb_2O_9$. The reaction flow was shown as below.

(1)

(2)

Last, an acid pickling was performed with dilute nitric acid.

Scheme II. $MgNb_2O_6$ was formed, and then MgO was added to transform it into $Mg_4Nb_2O_9$. The reaction flow was shown as below.

(3)

(4)

In Example A-1, the scheme II was performed. In detail, high purity MgO and $Nb_2O_5$ (molar ratio of MgO to $Nb_2O_5$ is 1:1) were placed in a grinding tank with alcohol as a solvent followed by ball milling with zirconia balls for 24 hours. The mixed slurry was dried at 80° C. followed by calcining in a high temperature furnace at 1050° C. for 10 hours so as to form the intermediate product, $MgNb_2O_6$. Thereafter, $MgNb_2O_6$ and MgO (molar ratio of $MgNb_2O_6$ to MgO is 1:3) were mixed by the same way of above step, and then the mixture was calcined in the high temperature furnace at 1050° C. for 10 hours in order to form $Mg_4Nb_2O_9$.

2. Co-Firing $Mg_4Nb_2O_9$, MgO, and $Al_2O_3$ (molar ratio of $Mg_4Nb_2O_9$: MgO:$Al_2O_3$ is 3:1:1) were placed in a grinding tank with alcohol as a solvent followed by ball milling with zirconia balls for 24 hours. The mixed slurry was dried at 80° C. followed by calcining in the high temperature furnace at 1050° C. for 10 hours and sintering at 1350° C. for 10 hours. The presence of MgO may contribute to reduce the sintering temperature. The reaction formula (5) is as follows.

$Mg_4Nb_2O_9+MgO+Al_2O_3 \rightarrow Mg_4Nb_2O_9+MgAl_2O_4$ (5).

Figure 1:
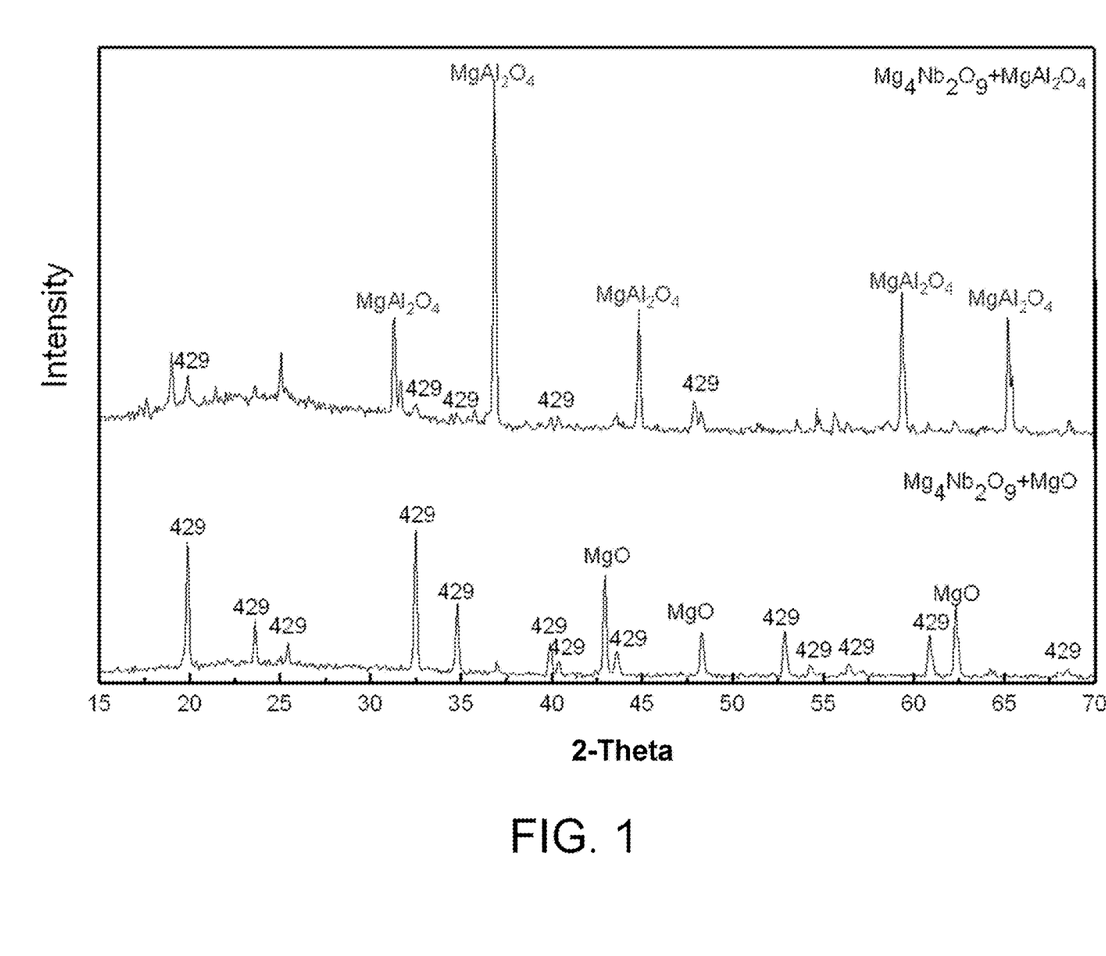
FIG. 1 is an X-ray diffraction analysis (XRD) curve of the co-fired product of the example A-1 according to the disclosure.

X-ray diffraction analysis (XRD) was performed on the co-fired product of the example A-1, and the result was shown in FIG. 1. It can be known from FIG. 1 that $Mg_4Nb_2O_9$ (marked as "429") and $MgAl_2O_4$ were actually formed in the co-fired product, while leaving a few of MgO unreacted.

Moreover, the dielectric constant (Dk) and the dielectric loss (Df) of the co-fired product of the example A-1 were detected, and the results were shown in Table 1. The term "Dielectric loss" is a function of the type of dielectric material, and usually well defined by a material's dissipation factor (Df), with lower value indicating lower dielectric loss.

3. Calculation of Theoretical Dk

According to above reaction formula (5), the theoretical Dk was calculated by formula (6) below.

$$\varepsilon_{mix} = \varepsilon_1 + 3v\varepsilon_1 \frac{(\varepsilon_2 - \varepsilon_1)}{\varepsilon_2 + 2\varepsilon_1 - v(\varepsilon_2 - \varepsilon_1)} \quad (6)$$

In formula (6), $\varepsilon_1$ represents the dielectric constant of $Mg_4Nb_2O_9$ (=13.5), $\varepsilon_2$ represents the dielectric constant of $MgAl_2O_4$ (=8.8), v represents volume fraction, and $\varepsilon_{mix}$ represents the theoretical minimum value of dielectric constant. The theoretical Dk was shown in Table 1.

EXAMPLES A-2, A-3, A-4, and A-5

The same preparation method as experimental example A-1 was used, and the difference is that the molar ratios of the raw materials were changed. The molar ratios and the results were as shown in Table 1.

EXAMPLE B-1

The same preparation method as experimental example A-1 was used, and the difference is that the calcination temperature was changed to 1150° C. The results of dielectric property were as shown in Table 2.

EXAMPLES B-2, B-3, B-4, and B-5

The same preparation method as experimental example B-1 was used, and the difference is that the molar ratios of the raw materials were changed. The results of dielectric property were as shown in Table 2.

EXAMPLE C-1

The same preparation method as experimental example A-1 was used, and the difference is that the calcination temperature was changed to 1250° C. The results of dielectric property were as shown in Table 3.

EXAMPLES C-2, C-3, C-4, and C-5

The same preparation method as experimental example C-1 was used, and the difference is that the molar ratios of the raw materials were changed. The results of dielectric property were as shown in Table 3.

EXAMPLE D-1

The same preparation method as experimental example A-1 was used, and the difference is that the sintering temperature was changed to 1500° C. The results of dielectric property were as shown in Table 4.

EXAMPLES D-2, D-3, D-4, and D-5

The same preparation method as experimental example D-1 was used, and the difference is that the molar ratios of the raw materials were changed. The results of dielectric property were as shown in Table 4.

EXAMPLE E-1

The same preparation method as experimental example B-1 was used, and the difference is that the sintering temperature was changed to 1500° C. The results of dielectric property are as shown in Table 5.

EXAMPLES E-2, E-3, E-4, and E-5

The same preparation method as experimental example E-1 was used, and the difference is that the molar ratios of the raw materials were changed. The results of dielectric property are as shown in Table 5.

EXAMPLE F-1

The same preparation method as experimental example C-1 was used, and the difference is that the sintering temperature was changed to 1500° C. The results of dielectric property were as shown in Table 6.

EXAMPLES F-2, F-3, F-4, and F-5

The same preparation method as experimental example F-1 was used, and the difference is that the molar ratios of the raw materials were changed. The results of dielectric property were as shown in Table 6.

TABLE 1

| Example | Molar ratio $Mg_4Nb_2O_9$ | $Al_2O_3$ | Actual Dk | Theoretical Dk | Actual Df |
|---|---|---|---|---|---|
| A-1 | 3 | 1 | 10.10 | 12.13 | 0.000254 |
| A-2 | 2 | 1 | 9.88 | 11.72 | 0.000310 |
| A-3 | 1 | 1 | 10.17 | 10.89 | 0.000916 |

TABLE 1-continued

| Example | Molar ratio $Mg_4Nb_2O_9$ | $Al_2O_3$ | Actual Dk | Theoretical Dk | Actual Df |
|---|---|---|---|---|---|
| A-4 | 1 | 2 | 8.50 | 10.13 | 0.000881 |
| A-5 | 1 | 3 | 8.66 | 9.79 | 0.003710 |

The calcination temperature is 1050° C., and the sintering temperature is 1350° C.

TABLE 2

| Example | Molar ratio $Mg_4Nb_2O_9$ | $Al_2O_3$ | Actual Dk | Theoretical Dk | Actual Df |
|---|---|---|---|---|---|
| B-1 | 3 | 1 | 10.16 | 12.13 | 0.000304 |
| B-2 | 2 | 1 | 9.91 | 11.72 | 0.000354 |
| B-3 | 1 | 1 | 10.09 | 10.89 | 0.001260 |
| B-4 | 1 | 2 | 9.03 | 10.13 | 0.005430 |
| B-5 | 1 | 3 | 9.09 | 9.79 | 0.005200 |

The calcination temperature is 1150° C., and the sintering temperature is 1350° C.

TABLE 3

| Example | Molar ratio $Mg_4Nb_2O_9$ | $Al_2O_3$ | Actual Dk | Theoretical Dk | Actual Df |
|---|---|---|---|---|---|
| C-1 | 3 | 1 | 10.37 | 12.13 | 0.000289 |
| C-2 | 2 | 1 | 10.47 | 11.72 | 0.001220 |
| C-3 | 1 | 1 | 10.32 | 10.89 | 0.001230 |
| C-4 | 1 | 2 | 8.65 | 10.13 | 0.003720 |
| C-5 | 1 | 3 | 8.71 | 9.79 | 0.005070 |

The calcination temperature is 1250° C., and the sintering temperature is 1350° C.

TABLE 4

| Example | Molar ratio $Mg_4Nb_2O_9$ | $Al_2O_3$ | Actual Dk | Theoretical Dk | Actual Df |
|---|---|---|---|---|---|
| D-1 | 3 | 1 | 10.44 | 12.13 | 0.000263 |
| D-2 | 2 | 1 | 10.27 | 11.72 | 0.000373 |
| D-3 | 1 | 1 | 9.73 | 10.89 | 0.000478 |
| D-4 | 1 | 2 | 9.27 | 10.13 | 0.000120 |
| D-5 | 1 | 3 | 9.84 | 9.79 | 0.000143 |

The calcination temperature is 1050° C., and the sintering temperature is 1500° C.

TABLE 5

| Example | Molar ratio $Mg_4Nb_2O_9$ | $Al_2O_3$ | Actual Dk | Theoretical Dk | Actual Df |
|---|---|---|---|---|---|
| E-1 | 3 | 1 | 10.556 | 12.13 | 0.000292 |
| E-2 | 2 | 1 | 10.184 | 11.72 | 0.000435 |
| E-3 | 1 | 1 | 9.775 | 10.89 | 0.000592 |
| E-4 | 1 | 2 | 9.443 | 10.13 | 0.000456 |
| E-5 | 1 | 3 | 9.687 | 9.79 | 0.000106 |

The calcination temperature is 1150° C., and the sintering temperature is 1500° C.

TABLE 6

| Example | Molar ratio | | Actual Dk | Theoretical Dk | Actual Df |
| --- | --- | --- | --- | --- | --- |
| | $Mg_4Nb_2O_9$ | $Al_2O_3$ | | | |
| F-1 | 3 | 1 | 10.458 | 12.13 | 0.000304 |
| F-2 | 2 | 1 | 10.246 | 11.72 | 0.000228 |
| F-3 | 1 | 1 | 9.775 | 10.89 | 0.000441 |
| F-4 | 1 | 2 | 9.605 | 10.13 | 0.000145 |
| F-5 | 1 | 3 | 9.893 | 9.79 | 0.000136 |

The calcination temperature is 1250° C., and the sintering temperature is 1500° C.

It can be seen that the detected dielectric constants (Dk) of all examples according to the disclosure were less than the theoretical Dk. In other words, the co-fired product has a lower Dk than expected value.

EXAMPLE G

The same preparation method as example A-1 was used, and the difference is the addition of glass component after forming the co-fired product. In detail, the resulting powders of example A-1 were added with glass powders ($SiO_2$—MgO—CaO—ZnO), wherein a weight ratio of the powders of example A-1 to the glass powders is 7:3. After ball milling, the mixture wad pressed into a cylindrical sample followed by sintering in the high temperature furnace at 850° C. for 1 hour. The cylindrical sample was measured at high frequency to obtain Dk=4.2 and Df=0.003. Therefore, it proves that the addition of glass component can be sintered at a low temperature (<900° C.) and maintain good electrical properties.

Figure 2A:
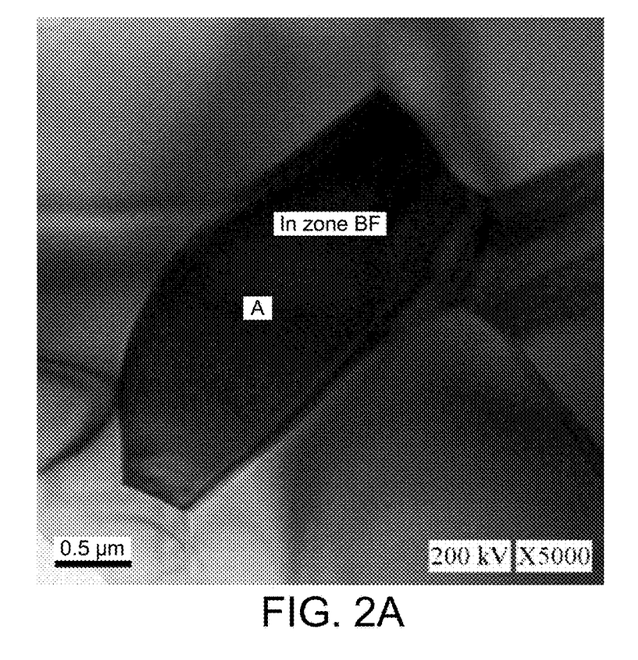
FIG. 2A is a 5,000-magnified scanning electron microscopy (SEM) image of the product of example G according to the disclosure.
Figure 2B:
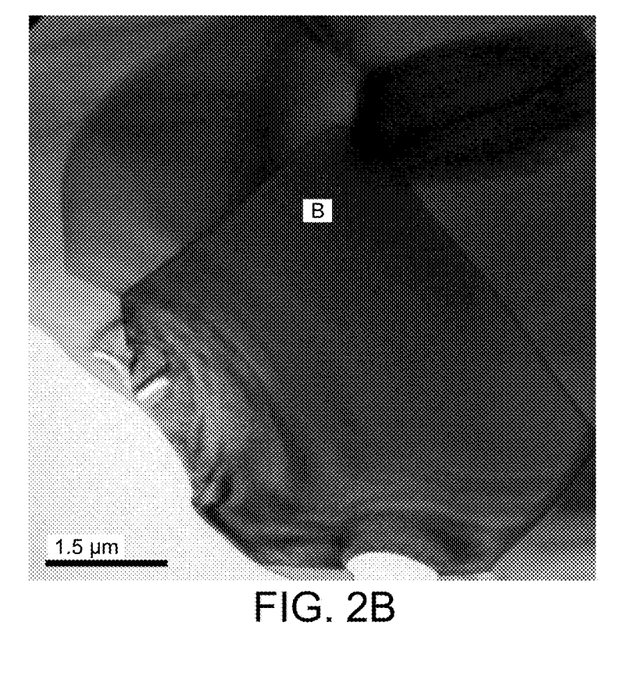
FIG. 2B is a 2,500-magnified scanning electron microscopy (SEM) image of the product of example G according to the disclosure.

Next, a scanning electron microscopy (SEM) analysis was performed on the product of example G to obtain the 5,000-magnified SEM image of FIG. 2A and the 2,500-magnified SEM image of FIG. 2B.

Comparative Example A $Mg_4Nb_2O_9$, $Al_2O_3$ and glass component (weight ratio of $Mg_4Nb_2O_9$:$Al_2O_3$:glass is 7:7:6) were ball milled and well-mixed, and the glass component is the same as example G, wherein a weight ratio of the powders of comparative example A to the glass powders is 7:3. Thereafter, the mixture was pressed into a cylindrical sample followed by sintering in the high temperature furnace at 850° C. for 1 hour. The cylindrical sample was measured at high frequency to obtain Dk=7.1 and Df=0.008. It is clear that Dk of the comparative example A is higher than that of example G. Therefore, it proves that comparative example A has poor electrical properties.

Figure 3:
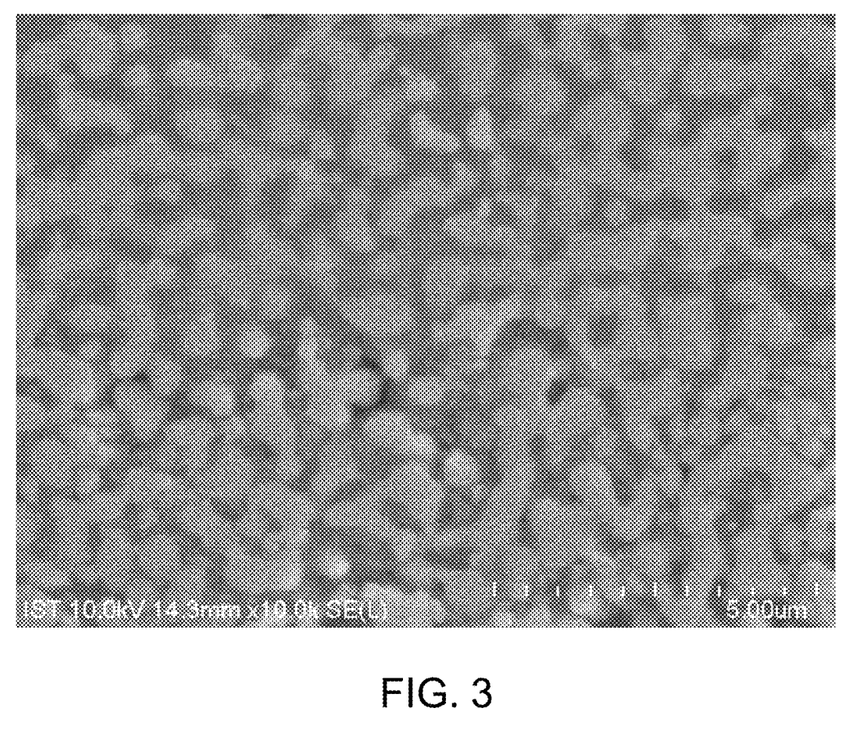
FIG. 3 is a SEM image of the product of comparative example A.

Next, a SEM analysis was performed on the product of comparative example A to obtain the SEM image of FIG. 3.

By comparing the two examples having glass component, it is seen that the actual Dk of example G is less than that of Comparative example A. Furthermore, it can be observed from FIG. 3 that the glass component of the comparative example A was mixed with $Mg_4Nb_2O_9$ and $Al_2O_3O$.

Figure 4A:
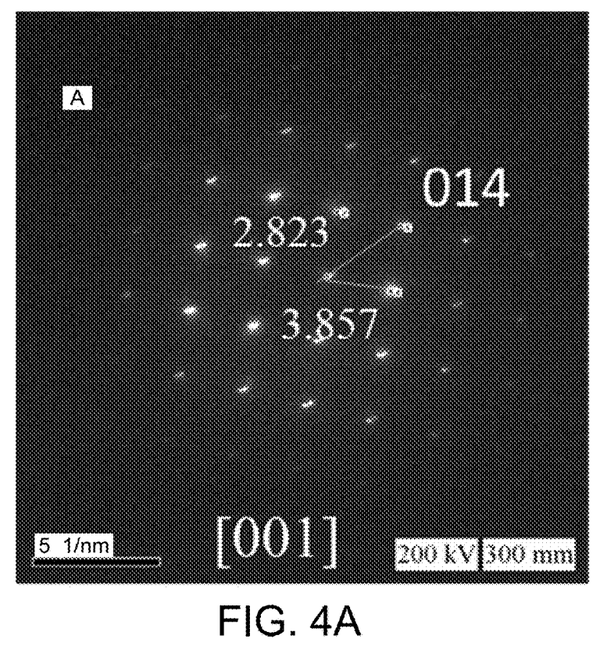
FIG. 4A is a [001] axis diffraction pattern of transmitted electron beam scattered from selected area 'A' in FIG. 2A.
Figure 4B:
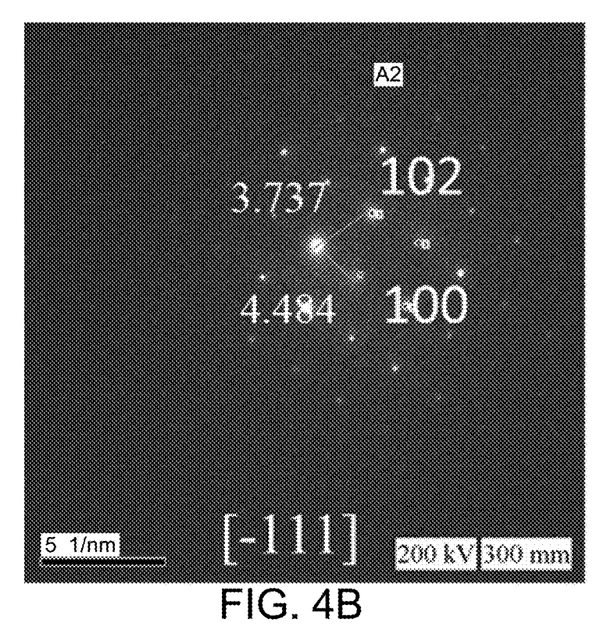
FIG. 4B is a [−111] axis diffraction pattern of transmitted electron beam scattered from selected area 'A' in FIG. 2A.

However, according to FIG. 4A and FIG. 4B, which are respectively a [001] axis diffraction pattern and a [−111] axis diffraction pattern of transmitted electron beam scattered from selected area 'A' in FIG. 2A, the distance between two of the diffraction points can be taken into the following formula (1). It can be proven that FIG. 4A and FIG. 4B are $Mg_4Nb_2O_9$ of a hexagonal system.

$$\text{Hexagonal: } \frac{1}{d^2} = \frac{4}{3}\frac{h^2+hk+k^2}{a^2} + \frac{l^2}{c^2} \quad (1)$$

Figure 5A:
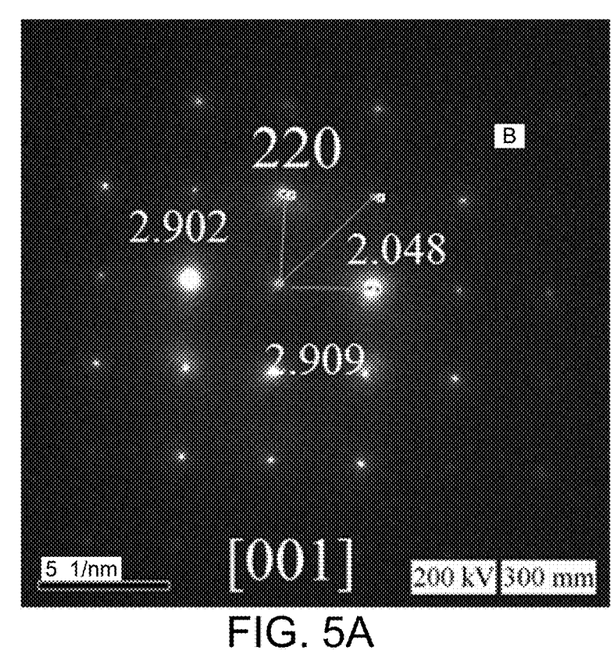
FIG. 5A is a [001] axis diffraction pattern of transmitted electron beam scattered from selected area 'B' in FIG. 2B.
Figure 5B:
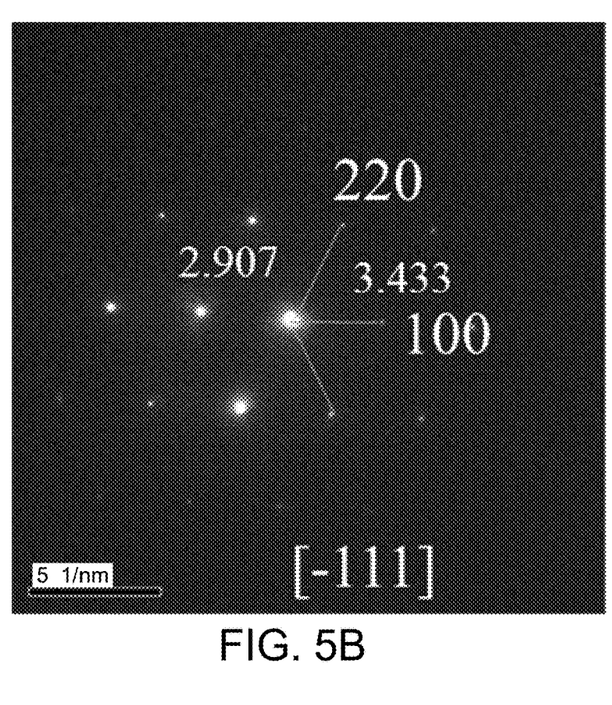
FIG. 5B is a [−111] axis diffraction pattern of transmitted electron beam scattered from selected area 'B' in FIG. 2B.

Moreover, according to FIG. 5A and FIG. 5B, which are respectively a [001] axis diffraction pattern and a [−111] axis diffraction pattern of transmitted electron beam scattered from selected area 'B' in FIG. 2B, the distance between two of the diffraction points can be taken into the following formula (2). It can be proven that FIG. 5A and FIG. 5B are $MgAl_2O_4$ of a cubic system.

$$\text{Cubic: } \frac{1}{d^2} = \frac{h^2+k^2+l^2}{a^2} \quad (2)$$

Therefore, from FIGS. 4A, 4B, 5A, and 5B, it can be observed that the glass component of the example G was not mixed with $Mg_4Nb_2O_9$ and $MgAl_2O_4$.

In summary, according to the disclosure, it can be accomplished that a dielectric ceramic composition with low dielectric constant and low dielectric loss at microwave frequency. In particular, the dielectric constant of the dielectric ceramic composition is lower than the theoretical dielectric constant.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A dielectric ceramic composition, comprising:
   a first inorganic component having a trigonal ditrigonal pyramidal crystal structure;
   a second inorganic component having a hexoctahedral crystal structure; and
   a solid solution portion of the trigonal ditrigonal pyramidal crystal structure and the hexoctahedral crystal structure is formed between the first inorganic component and the second inorganic component.

2. The dielectric ceramic composition according to claim 1, wherein the first inorganic component comprises $Mg_4Nb_2O_9$.

3. The dielectric ceramic composition according to claim 1, wherein the second inorganic component comprises $MgAl_2O_4$, $Mg_2SiO_4$, $Mg_2TiO_4$, $Zn_2TiO_4$, $\beta$-$SiO_2$, or $Zn_2VO_4$.

4. The dielectric ceramic composition according to claim 1, wherein the content of the first inorganic component in the dielectric ceramic composition is 25 to 50 atomic percent.

5. The dielectric ceramic composition according to claim 1, wherein the content of the second inorganic component in the dielectric ceramic composition is 25 to 50 atomic percent.

6. The dielectric ceramic composition according to claim 1, further comprising a glass component.

7. The dielectric ceramic composition according to claim 6, wherein the content of the glass component in the dielectric ceramic composition is 30 weight percent or less.

8. A dielectric ceramic composition, comprising:
   a first inorganic component, comprising $Mg_4Nb_2O_9$;
   a second inorganic component, comprising $MgAl_2O_4$, $Mg_2SiO_4$, $Mg_2TiO_4$, $Zn_2TiO_4$, $\beta$-$SiO_2$, or $Zn_2VO_4$; and a solid solution portion is formed between the first inorganic component and the second inorganic component.

9. The dielectric ceramic composition according to claim 8, wherein the content of the first inorganic component in the dielectric ceramic composition is 25 to 50 atomic percent.

10. The dielectric ceramic composition according to claim 8, wherein the content of the second inorganic component in the dielectric ceramic composition is 25 to 50 atomic percent.

11. The dielectric ceramic composition according to claim 8, further comprising a glass component.

12. The dielectric ceramic composition according to claim 11, wherein the content of the glass component in the dielectric ceramic composition is less than 30 weight percent or less.

* * * * *